UNITED STATES PATENT OFFICE.

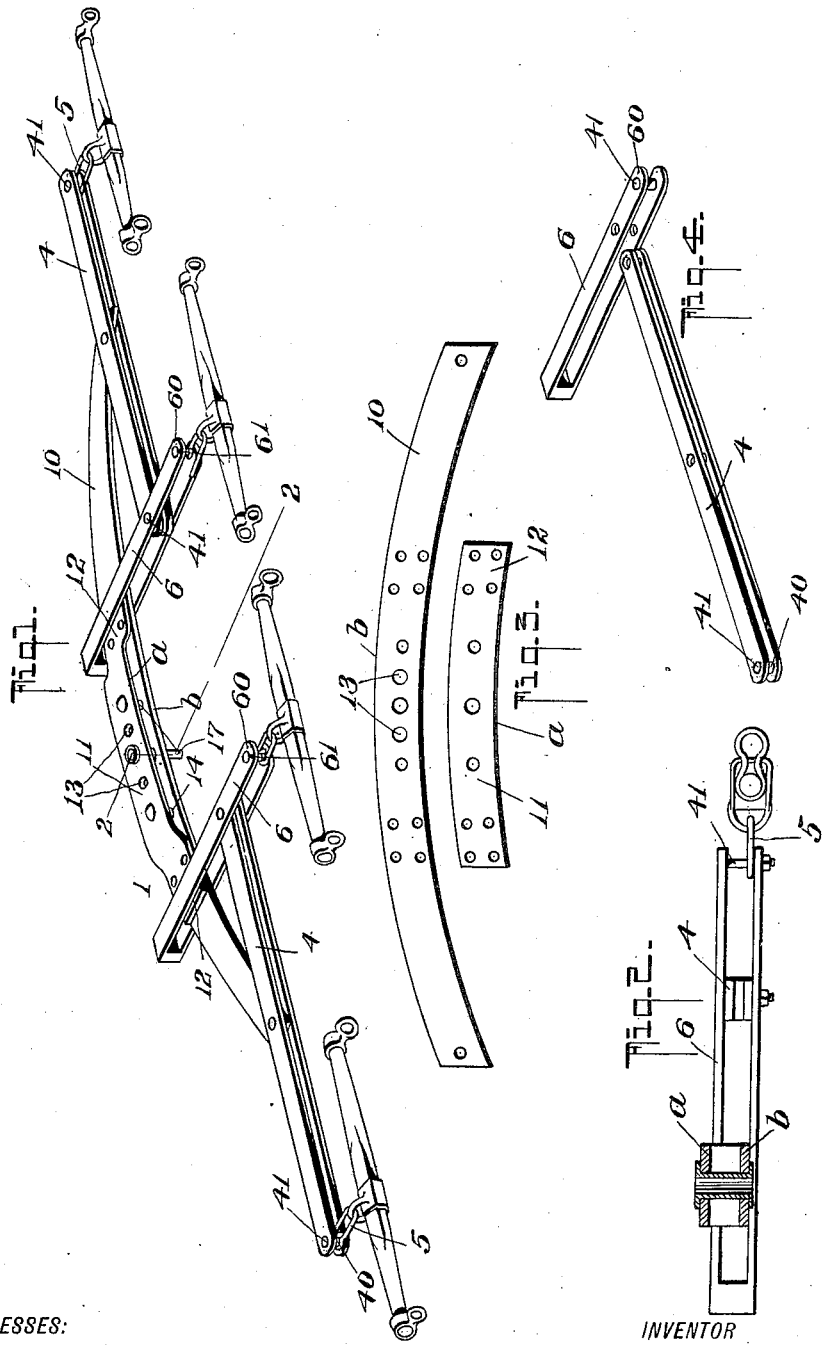

CHARLES A. BRADLEY, OF HAVILAND, KANSAS.

FOUR-HORSE DOUBLETREE.

No. 917,533.   Specification of Letters Patent.   Patented April 6, 1909.

Application filed May 19, 1908. Serial No. 433,632.

*To all whom it may concern:*

Be it known that I, CHARLES A. BRADLEY, of Haviland, in the county of Kiowa and State of Kansas, have invented a new and Improved Four-Horse Doubletree, of which the following is a specification.

My invention has for its object to provide a simple and inexpensive construction of double tree particularly adapted for four horses and it generically comprehends such arrangement and coöperative connection of the main or draft beam and the double trees that the said trees are held sufficiently far from the wagon wheels as to miss them in turning and at the same time give plenty of room for the "sawing" of the horses.

My invention also consists in certain details of construction and peculiar combination of parts, all of which will be hereinafter fully explained, specifically pointed out in the appended claims and illustrated in the accompanying drawings, in which:—

Figure 1, is a perspective view of my invention. Fig. 2, is a transverse section thereof on the line 2—2 of Fig. 1. Fig. 3, is a detail view of the parts that constitute the main or draft bar, and Fig. 4, is a similar view of one of the double trees and its inner or yoke member.

Referring now to the drawings, 1 designates the main or equalizer bar that consists of a long flat metal member 10 and a shorter member 11 that has its opposite ends bent inwardly at approximately right angles to form foot portions 12 that are riveted to the upper side of the bar 10, as clearly shown in Fig. 1 which also shows the said member 11 bent upwardly to form upper and lower strap bars $a$—$b$, so that the device can be readily fulcrumed onto the tongue or the wagon pole.

4 designates the double trees, each of which consists of a pair of metal bars held spaced apart at the ends by the spools 40 and rivets 41, the outer spool and rivet forming the fulcruming means for a swingle tree hook 5, mounted in the outer end of the tree and so shaped that it may be quickly connected with the swingle tree.

At the inner ends the trees 4 have a U-shaped member 6 connected thereto, the inner part of which is of sufficient length to straddle the part 2, and to limit the outward pull and the inner portion of the tree as clearly understood from the drawing, which also shows the front ends 60 of the member 6 extended and apertured as at 61, for receiving the swingle tree. In the outer ends of the double tree members are pivotally mounted U-shaped hooks pivotally connected at one end in such manner that they can be readily turned outwardly in the horizontal plane for reasons presently explained.

By reason of constructing the parts as hereinbefore described and shown, the use of the general form of clevises is avoided, which is a great advantage since no time is lost in searching for them, and further it enables hitching the horses closer to the wagon than otherwise can be done, and further since the hooks 5 when turned out allow the outside horse to be unhitched; and loops to which the inside horses are joined will not allow the horses to pull ahead far enough so that the tongue will come down. This advantage is especially valuable in places when it is necessary to take off the outside horses in order to enable the inside horses to draw the wagon into the elevator.

The outside device in practice being of metal and joined by the rivets as shown, rough weather or usage cannot affect the parts as there is no timber to warp or to screw the clevis on.

Having thus described my invention, what I claim and desire to secure by Letters Patent, is:—

1. A draft appliance of the character described, that comprises a metallic main bar, another bar mounted centrally thereon and spaced therefrom to form an upper member, tubular rivets mounted between the main and upper bars, a double tree comprising a pair of parallel bars, fulcrumed on each end of the member, a hook rotatably mounted at one end of the said parallel bars, and a U-shaped strap secured on the other end of the parallel bar, said strap straddling the main bar, for the purposes described.

2. The hereinbefore described improvement in draft appliances of the character stated, comprising in combination, a long flat metal bar, another bar having down turned ends that form foot portions fitted and secured on the flat metal bar, a double tree pivotally mounted on each end of the long bar, a hook rotatably mounted in the outer end of each bar, and a U-shaped member secured to the inner end of each double
5 tree, the free ends of which are apertured and project beyond the front edge of the double tree, the rear portion of the said U-shaped members straddling the main bar, for the purposes stated.

CHARLES A. BRADLEY.

Witnesses:
　Geo. E. Battin,
　C. L. Battin.